United States Patent [19]

Rehmer et al.

[11] Patent Number: 5,856,381
[45] Date of Patent: Jan. 5, 1999

[54] COMPOUNDING OF POLYMER DISPERSIONS

[75] Inventors: Gerd Rehmer, Beindersheim; Walter Holtrup, Frankenthal; Karlheinz Schwarz, Ludwigshafen, all of Germany

[73] Assignee: BASF Aktiengesellschaft, Ludwigshafen, Germany

[21] Appl. No.: 847,484

[22] Filed: Apr. 25, 1997

[30] Foreign Application Priority Data

Apr. 29, 1996 [DE] Germany ............ 196 17 183.0

[51] Int. Cl.⁶ ............................. C08J 3/05; C08J 3/215
[52] U.S. Cl. ............ 523/334; 523/333; 523/348; 524/800; 528/502 A; 528/502 F; 528/502 R; 366/152.3; 366/152.4; 366/158.5
[58] Field of Search ............ 523/333, 334, 523/348; 528/502 A, 502 F, 502 R; 366/152.3, 152.4, 158.5; 524/800

[56] References Cited

U.S. PATENT DOCUMENTS

| | | | |
|---|---|---|---|
| 2,769,795 | 11/1956 | Braendle | 523/334 |
| 4,099,005 | 7/1978 | Fullington et al. | 544/190 |
| 4,212,545 | 7/1980 | Lovasz et al. | 366/152.4 |
| 4,482,658 | 11/1984 | Vock et al. | 528/502 F |
| 4,605,689 | 8/1986 | Witheford et al. | 523/348 |
| 5,458,478 | 10/1995 | Stibal et al. | 523/351 |
| 5,634,715 | 6/1997 | Stehr et al. | 366/137 |

FOREIGN PATENT DOCUMENTS

| | | |
|---|---|---|
| 526 741 | 2/1993 | European Pat. Off. . |
| 608 567 | 8/1994 | European Pat. Off. . |
| 729 780 | 2/1996 | European Pat. Off. . |
| 577 920 | 6/1946 | United Kingdom . |

OTHER PUBLICATIONS

Streiff, "Maschinemarkt", Wuerzburg, 83, 1977, pp. 289–295.
Pat. Abst. of Jap., vol. 6, No. 83 (M–130), May 21, 1982 (English abstract of JP 57 020590; Feb. 3, 1982).

Primary Examiner—Andrew E. C. Merriam
Attorney, Agent, or Firm—Keil & Weinkauf

[57] ABSTRACT

A process for compounding polymer dispersions, which comprises circulating the polymer dispersion from a vessel (7) having a stirring device (6) through a line (3) having a mixing device (2) by means of a pump (4) which is located in the line (3), and, before the entry of the circulated polymer dispersion into the mixing device (2), metering at least one solution or dispersion of at least one compounding material from at least one stock container (5) via a supply line (9) into the circulated polymer dispersion.

8 Claims, 1 Drawing Sheet

COMPOUNDING OF POLYMER DISPERSIONS

The invention relates to a process for compounding polymer dispersions.

Dispersion systems consist of a continuous phase (dispersion medium) and at least one discontinuous phase (dispersed phase). The dispersion media are always fluid and can be liquids or gases. The dispersed phases are always condensed; they are solids or liquids.

In the case of polymer dispersions the dispersed phase is always a polymer and the dispersion medium is always a liquid, very often water.

Polymer dispersions are produced by two different methods. Most frequently, monomers are polymerized by emulsion, dispersion or suspension polymerization with the addition of dispersion auxiliaries. Furthermore, polymers prepared in other ways are subsequently dispersed.

For various applications, polymer dispersions are compounded. Thus preservatives (known as microbiocides) are added to the dispersions in order to protect them, for example, against bacterial or fungal infestation. In other cases, film-forming auxiliaries or leveling agents can be added to the dispersions for their use in coating compositions. Other compounding materials are antifoams, which are added to the dispersions in order to avoid foaming during the processing operations. Examples of other compounding materials are natural-resin or synthetic-resin emulsions or else solutions which are added to contact-adhesive dispersions in order to open up various fields of use, especially tackifying resin emulsions (tackifiers).

In many cases, the introduction of such compounding materials into dispersions leads to the formation of clumps, which are also referred to as coagulum, gel specks or bittiness. These agglomerations must be removed from the dispersions by filtration, at great expense.

The common method of adding compounding materials consists in stirring the dispersion and metering the compounding material directly into the vessel. Methods of this kind have the dis-advantage that coagulum is often formed, or else the resulting mixtures are not sufficiently stable, giving rise to creaming in the dispersion. The use of dispersions in coating systems or as binders for laminating films, however, requires dispersions that are low in coagulum and/or gel specks.

The economic disadvantage of these conventional mixing techniques is not only in the high filtration expense but also in that in the course of agglomeration the compounding materials are, in part, enclosed and are therefore unable to develop their full activity. In many such cases, it is necessary to add additional compounding material, and then the same problems occur.

In the past there have been many attempts to avoid the abovementioned disadvantages by diluting the compounding materials or by conducting finer metering over a longer period. This has the disadvantage that the compounding vessel is occupied for a disproportionately long time as a result of the compounding. The reduced availability of the vessel lowers the profitability of the process.

One method of overcoming the abovementioned difficulties, and especially of eliminating the long period of occupation of the vessel as a result of the compounding step, is the technique known as through-flow mixing (in-line dispersion). This is a continuous method in which two or more phases are brought into contact with one another. This process is described, inter alia, by S. Streiff in *Maschinenmarkt* 83 (1977) 17, pp. 289–295; corresponding apparatus for carrying out this process has been marketed and sold for some years by SULZER CHEMTECH AG.

In this process, the polymer dispersion is transferred from one vessel, by way of a line in which a pump and a mixing device are installed, to a second vessel. Between the pump and the mixer there is a feed line through which the compounding material is supplied continuously from a stock container. This process is disadvantageous in that, to implement it, a second vessel is necessary for accommodating the mixture of polymer dispersion and compounding material. Insofar as a continuous mixer is used as the mixing device, this process also has the disadvantage that the degree of mixing of the compounding material and the polymer dispersion is often inadequate.

It is an object of the present invention, accordingly, to provide a process for compounding polymer dispersions which is firstly intended to make it possible to achieve a sufficient degree of mixing between compounding material (s) and the polymer dispersion and secondly should be able to be carried out with relatively low expenditure on apparatus.

We have found that this object is achieved, surprisingly, by the compounding of polymer dispersions in accordance with the process set out below and that the disadvantages of the prior art are thereby overcome; in other words, the novel process leads to shorter compounding times, to markedly less coagulum, to a reduction in the filtration expense and, consequently, to an overall improvement in profitability.

The invention thus provides a process which comprises circulating the polymer dispersion from a vessel (7) having a stirring device (6) through a line (3) having a mixing device (2) by means of a pump (4) which is located in the line, and, before the entry of the circulated polymer dispersion into the mixing device (2), metering at least one solution or dispersion of at least one compounding material from at least one stock container (5) via a supply line (9) into the circulated polymer dispersion.

As pumps [(1)/(4)] it is possible to employ customary chemical pumps, such as peristaltic pumps, compressed-air membrane pumps, eccentric screw pumps, preferably eccentric screw pumps with a frequency-regulated drive, and gear pumps.

As stirrer (6) within the vessel (7) and/or as stirrer (11) within the stock container (5) it is possible to employ conventional stirrers, for example anchor propellers, MIG stirrers and paddle stirrers.

As mixing device [(2), (8)] it is possible to use dynamic or static mixing devices (dynamic mixers are described in: E. Wullenweber, *Chemie-Anlagen und -Verfahren*, Issue 4/1970, Konradin-Verlag, Stuttgart). Preference is given to static mixing devices owing to their extreme robustness and the associated low maintenance.

Examples which can be mentioned in this context are the static mixers from SULZER CHEMTECH AG. Among these it is possible, depending on the field of application, to use Sulzer mixers of the SMV type, which are employed predominantly for the mixing of liquids of low viscosity in the turbulent flow range; the Sulzer mixer of SMX type for viscous liquids or for liquids with a great difference in viscosity; and the Sulzer mixer of the SMXL type, which are mainly used in connection with intensifying the transfer of heat in the course of heating or cooling of temperature-sensitive viscous products, or can be used for mixing in long mixing sections with very small pressure drops.

Insofar as liquids of low viscosity are employed, these usually exhibit turbulent flow and can be mixed, as mentioned above, with the Sulzer mixer type SMV. In this case, the product stream is divided by the open, intersecting mixer element channels into individual streams. These streams exhibit a pronounced cross-flow. Furthermore, at each crossing point a portion is sheared off into the adjacent channel. Inhomogeneities therefore even themselves out between the lamellae of the mixing elements. So that uniform evening-out is obtained over the entire flow cross-section, the mixing elements are each offset by 90 degrees relative to one another.

As already mentioned, the Sulzer mixer type SMX is used to mix viscous liquids showing laminar flow, or those with large differences in viscosity. As a result of the plates arranged transversely relative to the axis of the tube, the components are continually broken up into layers and spread over the cross-section of the tube. The number of layers increases rapidly as the number of mixing elements goes up.

For further details regarding the above types of mixer, reference is made to the review by André Gather, *Kontakt erwünscht, Maschinenmarkt*, Würzburg 98 (1992) 27, pp. 18–23.

It is of course also possible to employ mixing devices similar in design from other companies.

All customary polymer dispersions can be compounded by the novel process. Examples which may be mentioned are the emulsion (co)polymers described in U.S. Pat. Nos. 2,754,280 and 2,759,564, in EP-B 0 037 923 and 0 065 253 and in DE-A 35 43 361 or 37 12 860.

The polymer dispersion dealt with in the course of the novel process is preferably an aqueous polymer dispersion.

In particular, the novel process is used to compound polymer dispersions for coating compositions and adhesives.

As compounding materials, it is likewise possible to employ all customary compounding materials within the context of the process under discussion here. Examples are preservatives (microbiocides), film-forming auxiliaries, thickeners, leveling agents, antifoams, natural-resin or synthetic-resin emulsions or other tackifier solutions, or mixtures of one or more of the above-mentioned compounding materials.

The compounding materials can be metered in undiluted or dilute form, in succession or—when using two or more compounding materials—as a mixture. Metered addition takes place either by means of a further pump (1) or by pressure via the supply line (9). When using mixtures of compounding materials, it is advantageous in certain cases if the mixture of compounding materials passes through an additional mixing device (8) before entering the dispersion stream. Mixtures of compounding materials may consist, for instance, of film-forming auxiliaries and antifoams.

The present invention therefore also provides a process in which a further mixing device (8) is installed in the supply line (9) for the at least one compounding material, or the stock container (5) is provided with a stirring device (11), or a mixing device (8) is installed in the supply line (9) and the stock container (5) is provided with a stirring device (11).

An additional mixing device (8) of this kind is absolutely necessary if, in the context of the present process, non-miscible compounding materials are metered in as a mixture. In such cases it is necessary to provide the stock container (5) as well with a stirring device (11), which can be identical to is or different from the stirring device (6).

In the context of the process according to the present invention, the compounding material can be metered through the supply line (9) into a polymer dispersion having a degree of conversion of 99% or more, or into a polymer dispersion having a degree of conversion of from about 80% to below 99%. Furthermore, a minimum throughflow must be maintained within the line during implementation of the process. If the throughflow is reduced too greatly, the result may be increased formation of coagulum, so that it is no longer possible to keep the proportion of coagulum within the dispersion at the target level of 0.1% or less, preferably 0.01% or less, when carrying out the novel process.

So that no additional agglomeration takes place as the dispersion passes through the line (3), during the addition of the compounding material the solution must at no time remain standing within the line during the addition of the compounding materials.

The minimum throughflow must be determined as a function of the compounding material. In each individual case it is determined, by methods known to the skilled worker, from the proportion of coagulum in the dispersion. Where this proportion of coagulum is too high, the pumping effort of the pump (4) is increased, although there is an upper limit to this since coagulation may occur as a result of shearing.

In order to avoid foaming in the course of compounding, it is often advantageous if the pressure prevailing within the vessel (7) is reduced relative to ambient pressure.

Any small amounts of coagulum occurring within the vessel (7) or inherent in the dispersion, and present in the form of clumps or specks, can be removed by means of an additional filter device (10) for removing solid or gel-form particles, which is installed within the line (3) on the pressure side or intake side relative to the pump (4). This filter device is preferably located within the line (3) between the pump (4) and the inlet of the supply line, ie. on the pressure side. Should it be necessary, it is of course also possible to install such a filter device within the supply line (9) of the compounding material, said additional filter device being arranged upstream of the pump (1), between the pump (1) and the mixing device (8), or downstream of the mixing device (8) up to directly before the point at which the supply line (9) opens out into the line (3).

Should relatively large amounts of such coagulum be present within the dispersion, it may if appropriate be necessary to add further compounding material, since the latter has been removed by filtration in partially enclosed form together with the coagulum; this may lead to a change in the proportion of dispersion to compounding material, which is undesirable. Depending on the particular application, the compounding materials may in general be employed in proportions of up to about 20% by weight, in specific cases even in higher proportions of up to 50% by weight, based in each case on the polymer dispersion.

Examples of such compounding materials are formulations of 1,2-benzisothiazolin-3-one sodium salt in a mixture of water and propylene glycol, such as Proxel XL2 from ICI, formulations of biocidal (chloro)isothiazolones, such as Aktizid LA from THOR CHEMIE GmbH, and Kathon LX plus from ROHM & HAAS.

Examples of further compounding materials are diols such as butylglycol, butyldiglycol, diethylene glycol, alcohols, such as ethanol, isopropanol and 1-octadecanol, solvents, such as Lusolvan FBH (BASF AG), complexing agents based, for example, on ethylenediaminetetraacetic acid, for example Trilon B Fluissig (BASF AG), synthetic resin solutions, such as the aqueous solutions of polyvinyl methyl ethers, for example Lutonal M 40 (BASF AG), solutions of ammonium polyacrylates, for example Collacral P (BASF AG), plasticizers, such as dibutyl phthalate, for example Palatinol C (BASF AG), anionic dispersions of montan ester wax, such as Gleitmitteldispersion 8645 (BASF AG), chemical compounds such as, for example, urea and ethyleneurea, sodium hydroxide, potassium hydroxide, ammonia, calcium hydroxide, zinc nitrate, zinc oxide, emulsifiers, for example alkylphenol ethoxylates, such as Emulgator 825 (BASF AG), block copolymers based on propylene oxide and ethylene oxide, antifoams, such as Dapro DF 900 from KRAHN CHEMIE GmbH and Byk-033 from BYK-CHEMIE GmbH, Wesel, Nopco 8034 E/D from HENKEL KGaA, compounds such as benzophenone, solvents such as white spirit and acetone, polyvinyl alcohols, etc., modified rosins, such as Tacolyn 3179 from HERCULES, Permatac A751 from ALLIANCE TECHNICAL PRODUCTS (ATP), and Snowtac grades from AKZO NOBEL.

It is also possible, in addition, in the context of the present process to install a device for determining the pH of the dispersions and/or a device for determining the viscosity of the dispersions within the novel mixing circuit in the line (3) or the supply line (9) or in both the line (3) and the supply line (9).

The novel process will now be illustrated in more detail with reference to examples.

EXAMPLES

The sieving residue indicated in the Examples below was determined in accordance with DIN 53786 as follows.

Deviating from DIN 53786, in each case 1 kg of the dispersion compounded in accordance with the Examples was filtered through a sieve with a mesh width of 0.125 mm. The residue was washed out with deionized water and dried. The sieving residue was then weighed. The result is given in % by weight, based in each case on the overall weight of the dispersion.

Comparison example

In a stirred vessel with MIG stirrer, 100 kg of butyldiglycol were metered over the course of one hour into 10 t of a polymer dispersion for coating purposes comprising a copolymer formed from 49.2% by weight n-butyl acrylate, 45.4% by weight styrene, 2.9% by weight acrylamide and 2.5% by weight acrylic acid, and stirring was continued for half an hour more. Then the sieving residue was determined. The proportion of coagulum was 0.132%.

EXAMPLE

Figure 1:
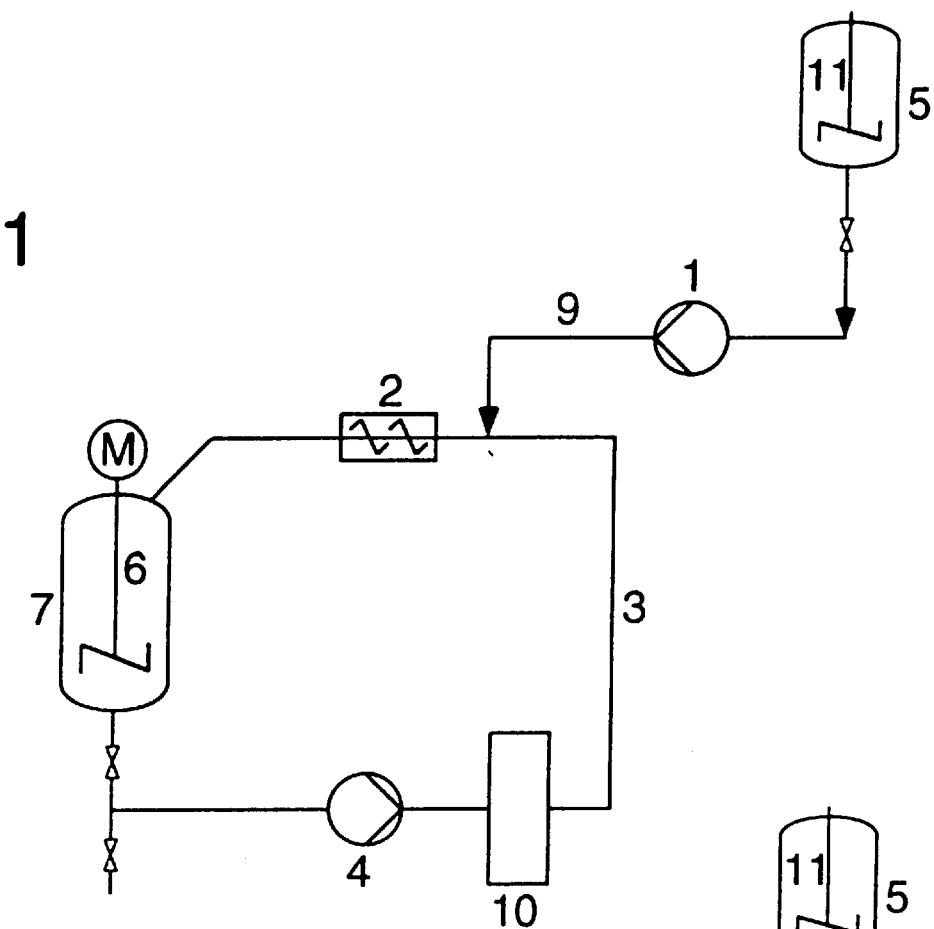
FIGS. 1 and 2 show mixing circuits which are intended to illustrate the novel process, in which the mixing circuit of FIG. 1 additionally has a filter device (10) and the mixing circuit of FIG. 2 additionally has a mixing apparatus (8) in the supply line (9) for supplying the compounding material.
Figure 2:
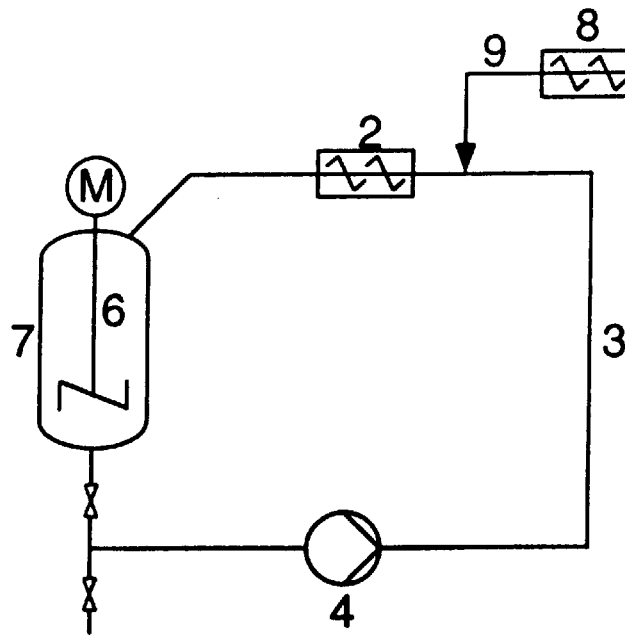

In a stirred vessel with a mixing circuit as shown in FIG. 1, 100 kg of butyldiglycol were metered over the course of 30 minutes into 10 t of the same polymer dispersion as in the Comparison Example, and pumped circulation was maintained, with stirring, for 5 minutes following the metered addition. Then the sieving residue was again determined. The proportion of coagulum was 0.008%.

We claim:

1. A process for the compounding of an aqueous polymer dispersion, which comprises
    a) circulating the aqueous polymer dispersion between a vessel (7) having a stirring device (6) and a line (3) having a mixing device (2) by means of a pump (4) which is located in the line (3), and
    b) metering into said circulated polymer dispersion at least one solution or dispersion of at least one compounding material before the entry of the circulated polymer dispersion into the mixing device (2),
and wherein the solution or dispersion of the compounding material is supplied from at least one stock container (5) via a supply line (9).

2. The process defined in claim 1, wherein
    i) a further mixing device (8) is installed in the supply line (9), or
    ii) the stock container (5) is provided with a stirring device (11), or
    iii) a mixing device (8) is installed in the supply line (9) and the stock container (5) is provided with a stirring device (11).

3. The process defined in claim 2, wherein at least one of the two mixing devices (2) and (8) is a static mixer.

4. The process defined in claim 1, wherein a filter device (10) is installed in the line (3) on the pressure side or the suction side of the pump (4), which filter is suitable for removing solid or gel-form particles.

5. The process defined in claim 1, wherein
    a device for determining the pH of the solution(s), or
    a device for determining the viscosity of the solution(s), or
    a device for determining the pH of the solution(s) and a device for determining the viscosity of the solution(s) is or are installed in the line (3) or in the supply line (9) or in the line (3) and in the supply line (9).

6. The process defined in claim 1, wherein the polymer dispersion is a dispersion for coating compositions or adhesives.

7. The process defined in claim 1, wherein the compounding materials are preservatives, film-forming auxiliaries, thickeners, leveling agents, antifoams, natural-resin or synthetic-resin emulsions or other tackifier solutions or mixtures thereof.

8. The process defined in claim 1, wherein the pressure prevailing within the vessel (7) is lower than the ambient pressure.

* * * * *